(12) United States Patent
Slack et al.

(10) Patent No.: US 10,155,348 B2
(45) Date of Patent: Dec. 18, 2018

(54) MATERIAL PREPARATION DEVICE

(71) Applicant: Orbital ATK, Inc., Plymouth, MN (US)

(72) Inventors: Jason K. Slack, Clinton, UT (US); Christopher J. Madsen, Ogden, UT (US); Don C. Jones, West Haven, UT (US); Vernon M. Benson, Morgan, UT (US); Peter G. Turner, Eden, UT (US); Ralph Douglas Cope, Elkton, MD (US); Kimberly Ann Ferrara, Middletown, DE (US); Anthony Dale Johnson, Conowingo, MD (US); Michael James Case, Newark, DE (US); Jesse Paul Brown, Newark, DE (US); James Gargel, Bear, DE (US); Steven Andrew Cope, Newark, DE (US); Kyle Putnam Tarry, Middletown, PA (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 0 days.

(21) Appl. No.: 15/137,832

(22) Filed: Apr. 25, 2016

(65) Prior Publication Data

US 2016/0236426 A1    Aug. 18, 2016

Related U.S. Application Data

(62) Division of application No. 12/759,333, filed on Apr. 13, 2010, now Pat. No. 9,321,220.

(51) Int. Cl.
*B32B 41/00* (2006.01)
*B29C 70/54* (2006.01)
(Continued)

(52) U.S. Cl.
CPC ............ *B29C 70/545* (2013.01); *B29C 70/20* (2013.01); *B29C 70/22* (2013.01); *B29C 70/38* (2013.01);
(Continued)

(58) Field of Classification Search
CPC ....... B29C 70/545; B29C 70/20; B29C 70/22; B29C 70/38; B29C 70/50; Y10T 156/1052; B29K 2105/243
(Continued)

(56) References Cited

U.S. PATENT DOCUMENTS 1,351,374 A    8/1920  Crowell
3,278,100 A    10/1966 Hornberger
(Continued)

FOREIGN PATENT DOCUMENTS

CA    1099499    4/1981
EP    1992872 A2    11/2008
(Continued)

OTHER PUBLICATIONS

Author Omitted; "Comments of Third Party"; Japanese Patent Application No. 2013-223432; received by the Esquire Commissioner of the Japanese Patent Office on Dec. 23, 2015; 8 pages.
(Continued)

*Primary Examiner* — Michael N Orlando
*Assistant Examiner* — Joshel Rivera
(74) *Attorney, Agent, or Firm* — TraskBritt

(57) ABSTRACT

A material preparation device is provided. The material preparation device includes a bias-ply assembly, a feedstock assembly and an application head. The bias-ply assembly is configured to pass a bias-ply backing material along a first path. The feedstock assembly is configured to pass a feedstock along a second path that crosses the first path at a select angle. The feedstock includes resin pre-impregnated fiber-
(Continued)

reinforced material (pre-preg) having the fibers at a first orientation relative to an edge of the feedstock. The application head is configured to transfer the pre-preg from the feedstock to the bias-ply backing material at a location where the first path crosses the second path to form a bias-ply with the fibers of the pre-preg having a second, different orientation relative to an edge of the formed bias-ply.

39 Claims, 12 Drawing Sheets

(51) Int. Cl.
*B29C 70/20* (2006.01)
*B29C 70/22* (2006.01)
*B29C 70/38* (2006.01)
*B29C 70/50* (2006.01)
B29K 105/24 (2006.01)

(52) U.S. Cl.
CPC ........ *B29C 70/50* (2013.01); *B29K 2105/243* (2013.01); *Y10T 156/1052* (2015.01)

(58) Field of Classification Search
USPC ....... 156/152, 177, 178, 249, 260, 265, 266, 156/285, 519, 552, 580, 583.1, 64, 350, 156/351, 378, 379, 439
See application file for complete search history.

(56) References Cited

U.S. PATENT DOCUMENTS

| | | | |
|---|---|---|---|
| 4,256,522 A | 3/1981 | Britton | |
| 4,402,888 A | 9/1983 | Runck | |
| 4,460,531 A | 7/1984 | Harris et al. | |
| 4,548,770 A | 10/1985 | Holland | |
| 4,591,402 A | 5/1986 | Evans et al. | |
| 4,929,319 A | 5/1990 | Dinter et al. | |
| 5,024,862 A | 6/1991 | Frank | |
| 5,173,137 A | 12/1992 | Okihara et al. | |
| 5,173,138 A | 12/1992 | Blauch et al. | |
| 5,351,111 A | 9/1994 | Takafuji et al. | |
| 5,413,815 A | 5/1995 | Williams et al. | |
| 5,685,416 A | 11/1997 | Bonnet | |
| 5,795,426 A | 8/1998 | Jackson et al. | |
| 6,050,517 A | 4/2000 | Dobrescu et al. | |
| 6,073,670 A | 6/2000 | Koury | |
| 6,176,957 B1 | 1/2001 | Bolitsky et al. | |
| 7,086,627 B2 | 8/2006 | Kehler et al. | |
| 7,540,447 B2 | 6/2009 | Shiraishi et al. | |
| 2001/0015317 A1 | 8/2001 | Kawabe et al. | |
| 2003/0199337 A1 | 10/2003 | Hebert et al. | |
| 2004/0026025 A1 † | 2/2004 | Sana | |
| 2004/0098852 A1 † | 5/2004 | Nelson | |
| 2006/0003133 A1 | 1/2006 | Johnson | |
| 2007/0017628 A1 | 1/2007 | Evans | |
| 2009/0301642 A1 | 12/2009 | Patel et al. | |
| 2011/0192535 A1 | 8/2011 | Turner | |
| 2011/0247743 A1 | 10/2011 | Slack et al. | |

FOREIGN PATENT DOCUMENTS

| | | | |
|---|---|---|---|
| JP | 354159476 A | | 12/1979 |
| JP | 2153938 A | † | 6/1990 |
| JP | 06024615 | | 2/1994 |
| JP | 11180607 | | 7/1999 |
| JP | 2001213557 | | 2/2000 |
| JP | 2002124148 A | | 4/2002 |
| JP | 2004314565 | | 4/2003 |
| JP | 2004181683 A | † | 7/2004 |
| JP | 2009070796 A | | 4/2009 |

OTHER PUBLICATIONS

Accudyne Systems, Inc. "Three New Composite Machines". [online] [retrieved on Mar. 23, 2010] retrieved at <http://accudyne.com/>.
European Communication: Partial European Search Report for European Patent Application EP10189022.6, dated Aug. 18, 2011.
Japanese Decision of Rejection for Japanese Patent Application No. 2010-266467 dated Jul. 29, 2013, 5 pages.
Office Action for Japanese Patent Application No. 2013-223432, dated Aug. 3, 2015, 10 pages.
Translation of Office Action from Japanese Patent Application No. 2010-266467, dated Oct. 24, 2012, 4 pages.
Strobel, Market Al., A Comparison of Corona-Treated and Flame-Treated Polypropylene Films. Plasmas and Polymers, vol. 8, No. 1 (Mar. 2003), pp. 61-95.
Zander, Nicole et al., Oxidation of Polyethylene: A Comparison of Plasma and Ultraviolet Ozone Processing Techniques. Army Research Laboratory, Aberdeen Proving Ground, MD 21005-5069, ARL-TR-4701 (Jan. 2009), 21 pages.
Notice of Opposition Enclosure "Facts and Arguments", filed with Opposition to: European Patent No. 2 377 673 B1 of Opponent Spandern Uwe, dated Sep. 22, 2016, 15 pages.
European Patent Office Notice of Opposition to a European Patent No. EP2377673; filed by Representative of Opponent Spandern Uwe, dated Sep. 22, 2016, 5 pages.
Communication pursuant to Article 94(3) EPC in European Application No. 15186191.1, dated Jan. 31, 2018 (5 pages).

† cited by third party

MATERIAL PREPARATION DEVICE

CROSS-REFERENCE TO RELATED APPLICATION

This application is a divisional of U.S. patent application Ser. No. 12/759,333, filed Apr. 13, 2010, now U.S. Pat. No. 9,321,220, issued Apr. 26, 2016 the disclosure of which is hereby incorporated herein in its entirety by this reference.

BACKGROUND

In the formation of composite laminate structures, layers of pre-impregnated material (pre-preg) are typically laid up over each other, compacted and heat set (cured or fused) to form the composite laminate structure. Pre-preg is made of reinforcing fibers such as carbon, glass, aramid, and the like, that are bonded together with a resin system. Often, to achieve a desired laminate characteristic, the plies of pre-preg are layered with their fibers having different orientations in relation to each other to tailor the structural properties of the laminates. For example, in applications for forming high strength-low weight complex shaped structures it may be desired to apply and form one layer of pre-preg at a time on a tool with one or more of the different layers having different fiber orientations than another layer. However, pre-preg (resin pre-impregnated fiber-reinforced material) is typically only supplied by a manufacturer as 0° tape (with all its fibers orientated in one direction in relation to an edge of the pre-preg roll) or 0/90 fabric (continuous fiber in the roll-up direction, 0°, with discontinuous woven or stitched fibers running transverse to the roll-up direction, 90°). It is desired to have an efficient method of forming pre-preg supply rolls with many different fiber orientations so that successive layers of pre-preg can be automatically applied and formed over long narrow structures, with layers having different fiber orientations. Examples of common orientations, besides 0 degree and 0/90 degree, that are needed in a continuous roll format include, but are not limited to, 30°, 45°, 60°, 90°, 120°, 135°, and 150°. Combinations of these are also needed including, but not limited to, 45°/135°, 60°/150°, 30°/120°.

For the reasons stated above and for other reasons stated below, which will become apparent to those skilled in the art upon reading and understanding the present specification, there is a need in the art for a process and device to automatically form a continuous bias-ply roll of material having fibers at a select orientation.

BRIEF SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a material preparation device is provided. The material preparation device includes a bias-ply assembly, a feedstock assembly, an application head and controller. The bias-ply assembly is configured to pass a bias-ply backing material along a first path. The feedstock assembly is configured to pass feedstock along a second path that crosses the first path at a select angle. The feedstock includes resin pre-impregnated fiber-reinforced material (pre-preg) having fibers at a first orientation relative to an edge of the feedstock. The application head is configured to transfer the pre-preg from the feedstock to the bias-ply backing material at a location where the first path crosses the second path to form a bias-ply with the fibers of the pre-preg having a second, different orientation relative to an edge of the formed bias-ply. The controller is configured to control the bias-ply assembly to pass the bias-ply backing material. The controller is further configured to control the feedstock assembly to pass the feedstock. The controller is further yet configured to control the application head in transferring the pre-preg.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof and in which is shown by way of illustration, specific embodiments in which the invention may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
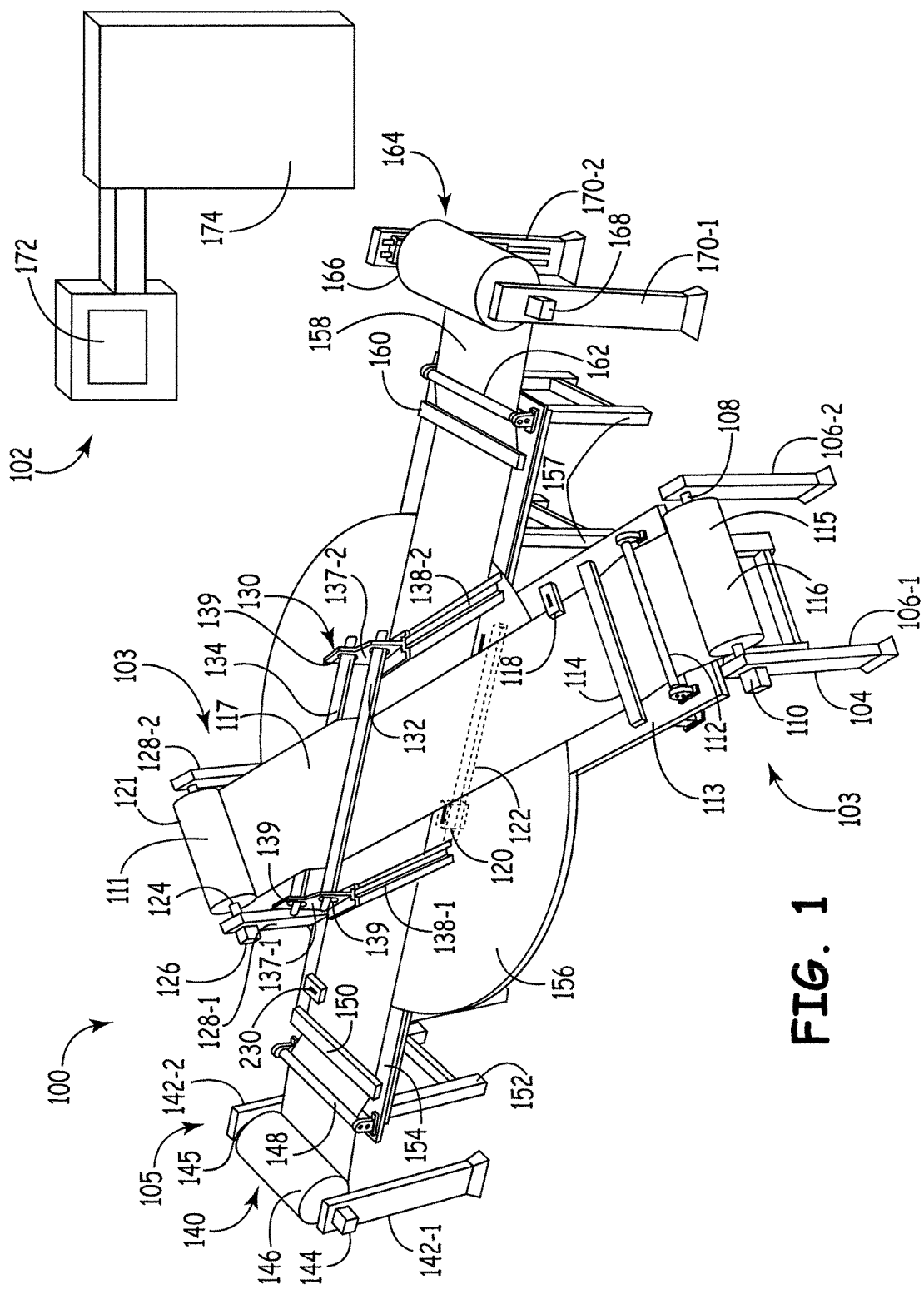
FIG. 1 is a side perspective view of a material preparation machine of one embodiment of the present invention.

Embodiments of the present invention provide devices and methods that automatically convert pre-preg material of select fiber orientations relative to the roll from a manufacturer (such as 0° uni-directional tape (uni-tape) or 0/90 fabric) into a bias-ply having the fibers at different select orientations relative to the roll. Referring to FIG. 1, a material preparation device 100 of an embodiment is illustrated. The material preparation device 100 can generally be referred to a material preparation machine (MPM) 100. The MPM 100 includes a control system 102 that controls operations of the MPM 100. The control system 102 is further discussed below. The MPM 100 also includes a feedstock assembly 103 and a bias-ply assembly 105. The feedstock assembly 103 includes a roll of feedstock material (generally uni-tape or 0/90 fabric) 116. The feedstock 116 includes feedstock backing material 117 and resin pre-impregnated fiber-reinforced material (pre-preg) 300 (illustrated in FIGS. 3A through 3E). The pre-preg 300 includes fibers that are typically oriented at 0° to an edge of the material (parallel with the edge of the roll) and a resin that is cured or fused by heat. The bias-ply assembly 105 includes a roll of new bias-ply backing material 146 upon which the pre-preg 300 from the feedstock 116 is placed in a select orientation to form a bias-ply 158. Hence, the bias-ply 158 will have a select orientation relating to the orientation of the fibers in the pre-preg 300 such as, but not limited to, 30°, 45°, 60°, 90°, 120°, 135°, and 150°. The bias-ply backing material 146 can be made from any suitable material such as, but not limited to, polyethylene, paper or other carrier. In some embodiments, the bias-ply backing material 146 initially has no pre-applied pre-preg material adhered to it. A single bias-ply can be formed onto the bias-ply backing material 146, having its fibers at a select orientation.

The feedstock assembly 103 includes a feedstock supply roll unwind assembly 104 and a feedstock backing material gathering assembly 121. The feedstock supply unwind assembly 104 includes a first feedstock support 106-1 and a second feedstock support 106-2. A feedstock unwind chuck 108 is rotationally attached between the first and second feedstock supports 106-1 and 106-2. A feedstock unwind chuck tension motor 110 is coupled to rotate feedstock unwind chuck 108. In use, a feedstock unwind 115 including a roll of feedstock 116 is mounted on the feedstock unwind chuck 108. The feedstock 116 is threaded between feed out pinch rollers 112 that in one embodiment are driven by a servo motor (not shown). A guide 114 is coupled to a feedstock support table 113. The feedstock 116 passes through guide 114. An alignment sensor 118 senses alignment of the feedstock 116 and is in communication with a controller 174 of the control system 102. The feedstock 116 further passes through an application head 130. The application head 130 includes an application shoe bar 132 (first bar) and a turn bar 134 (second bar) that are retained between brackets 137-1 and 137-2. Ends of the application shoe bar 132 and turn bar 134 are received in respective slots 139 of retaining brackets 137-1 and 137-2. The slots 139 allow the forming bars 132 and 134 to move in a vertical direction. The retaining brackets 137-1 and 137-2 are slidably coupled to cross travel tracks 138-1 and 138-2. This sliding connection allows the brackets 137-1 and 137-2 and, hence, application shoe bar 132 and turn bar 134, to move horizontally across a width of the bias-ply backing material 146. Movement of the application head 130 is further discussed below.

Also illustrated in FIG. 1 is a cutter 120 that works in conjunction with the application head 130 to cut the pre-preg 300 from the feedstock 116. The cutter 120 is slidably coupled to a cutting track 122 that enables the cutter 120 to cut all the pre-preg 300 across a width of the feedstock 116, but not the feedstock backing material 117. In one embodiment, the cutter 120 is a scribe cutter. After the pre-preg 300 has been cut by the cutter 120, the remaining feedstock backing material 117 (without the pre-preg 300) is then collected on the feedstock backing material gathering assembly 121. The feedstock backing material gathering assembly 121 includes a feedstock backing material roll-up chuck 124 that collects the feedstock backing material 117 on a feedstock backing windup 111. The feedstock backing material roll-up chuck 124 is rotationally coupled between backing material supports 128-1 and 128-2. A feedstock backing material roll-up tension motor 126 is used to rotate the feedstock backing material roll-up chuck 124. Similarly, the feedstock roller of assembly 104 includes a feedstock roll-off tension motor 110 to rotate the feedstock roll-off 108. The controller 174 of the control system 102 controls operation of the feedstock backing material roll-up tension motor 126 and the feedstock roll-off tension motor 110.

The bias-ply assembly 105 of the MPM 100 includes a bias-ply backing material feed assembly 140 and a bias-ply gathering assembly 164. The bias-ply backing material feed assembly 140 provides a new bias-ply backing material 146 upon which the bias-ply 158 is formed. The bias-ply backing material feed assembly 140 includes a bias-ply backing material roll-off chuck 205 (illustrated in FIG. 2) that retains the bias-ply backing material 146 on a roll-off 145 and is rotationally coupled between supports 142-1 and 142-2. A bias-ply backing material roll-off tension motor 144 is used to tension the bias-ply backing material roll-off 205, which is controlled by the controller 174 of control system 102. The bias-ply backing material 146 is passed between backing redirect rollers 148 that are, in one embodiment, motorized by a servo motor (not shown). The bias-ply backing material 146 then passes between bias-ply backing material guide 150 and support table 154. In one embodiment, material guide 150 includes a bias-ply backing material treatment device 453 to increase tackiness of the bias-ply backing material 146. The backing treatment device 453 is further described with regard to FIG. 4, discussed below. A bias-ply alignment sensor 230 senses alignment of the bias-ply backing material 146 and is in communication with the controller 174 of the control system 102.

Support table 154 includes support legs 152 and 157. The bias-ply backing material 146 passes under an application shoe 132 and turn bar 134 of the application head 130. The application head 130 transfers the pre-preg with the 0° orientation fibers on the feedstock 116 to the bias-ply backing material 146 that is at a select angle in relation to the bias-ply backing material 146 to achieve a desired fiber orientation in the formed bias-ply 158. The formed bias-ply 158 passes between a bias-ply guide 160 and support table 154 and then between nip rollers 162. In one embodiment, the bias-ply guide 160 further includes a defect (flaw) detector such as defect detector 451, discussed below in regard to FIG. 4. Moreover, in one embodiment, the nip rollers 162 are heated nip rollers 162. In this embodiment, the heated nip rollers 162 heat the fibers 300 to help adhere the fibers 300 to the bias-ply backing material 146. The formed bias-ply 158 is then gathered by a bias-ply gathering assembly 164. The bias-ply gathering assembly 164 includes a bias-ply roll-up 166 to collect the bias-ply 158, which can generally be referred to as a "bias-ply roll-up." The bias-ply roll-up 166 is rotationally coupled to supports 170-1 and 170-2. A bias-ply roll-up tension motor 168 is coupled to rotate the bias-ply roll-up 166. The bias-ply roll-up tension motor 168 is controlled by the controller 174 of the control system 102. The control system 102 further includes a control console 172 that provides input and output information to the control system 102. In one embodiment, the control console 172 is a touch screen display.

Figure 2:
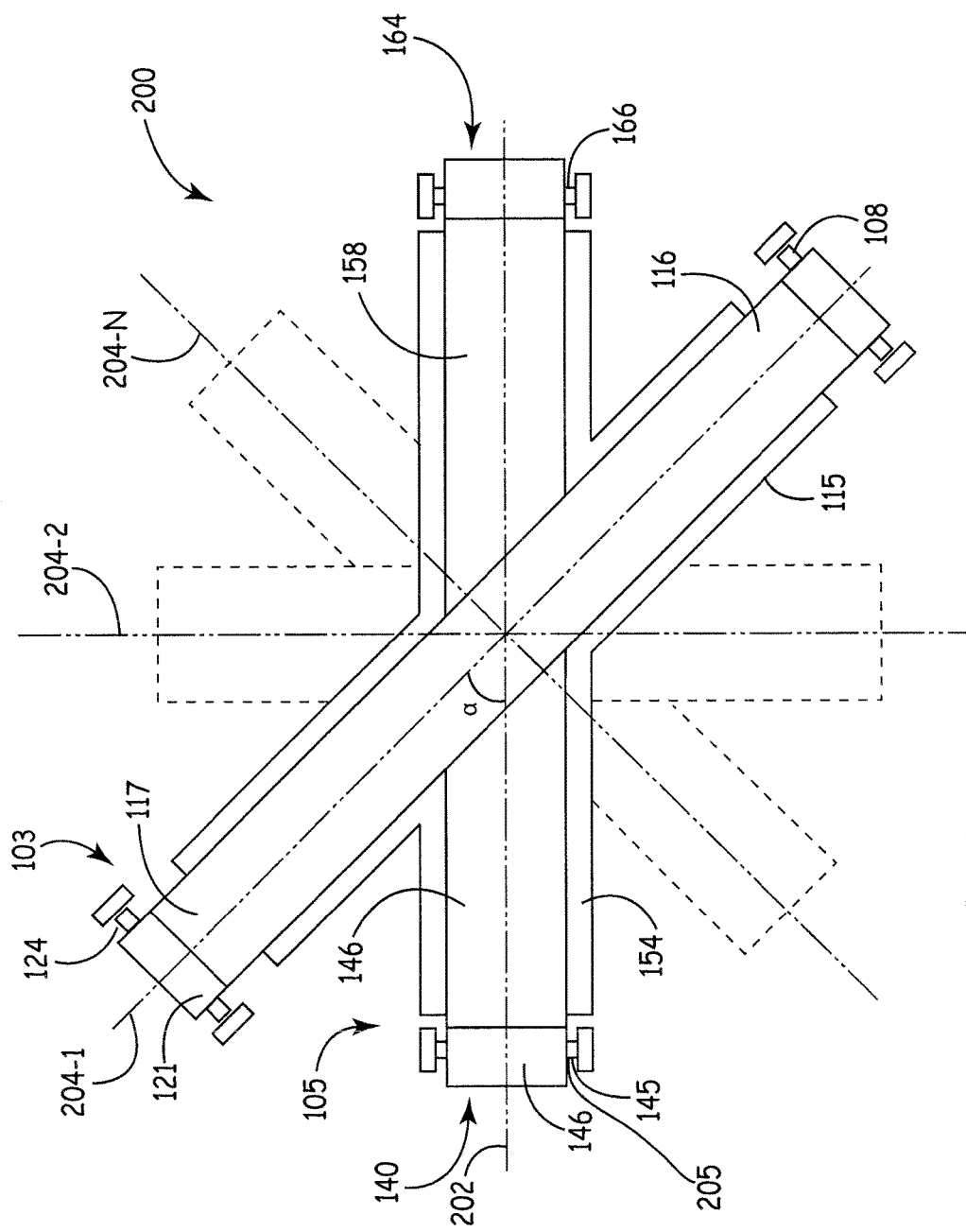
FIG. 2 is a top view of a material preparation machine illustrating different possible orientations of one embodiment of the present invention.

The MPM 100, as discussed above, forms a bias-ply 158 having fibers at a select orientation from a 0° fiber orientation feedstock 116. In this example embodiment, the select orientation of the bias-ply 158 is determined by the angle in which a path the feedstock 116 of the feedstock assembly 103 crosses a path of the bias-ply backing material 146 of the bias-ply assembly 105. In other embodiments, where the feedstock does not have a 0° fiber orientation, the orientation of fibers in a formed bias-ply is determined by taking into consideration the fiber orientation in the pre-preg of the feedstock and the angle between the two paths. In the embodiment of FIG. 1, a round base support 156 is coupled to support table 154 of the bias-ply assembly 105. The feedstock assembly 104, however, is rotationally coupled to the round base support 156. Hence, the orientation of the feedstock assembly 103 can be changed in relation to the bias-ply assembly 105. This is further illustrated in FIG. 2. In particular, FIG. 2 illustrates a top view of a partial MPM assembly 200. The bias-ply assembly 105 is positioned along axis 202. The feedstock assembly 103 is positioned along axis 204-1. Axis 204-1 is positioned at a select angle α in relation to bias-ply axis 202 of the bias-ply assembly 105. Hence, with the feedstock 116 having fibers at a 0° orientation, the resulting orientation of the fibers in the formed bias-ply 158 will be angle α. In some embodiments, angle α is adjusted by rotating the feedstock assembly 103 in relation to the bias-ply assembly 105. Different angles α that achieve different ply orientations in the bias-ply 158, as indicated by axes 204-2 and 204-N are possible. Example a angles include 45° between bias-ply axis 202 and feedstock axis 204-1, 90° between bias-ply axis 202 and feedstock axis 204-2 and 135° between bias-ply axis 202 and feedstock axis 204-N. The above values for angle α are only examples, angle α can be any angle typically between 17.5° and 172.5°.

Figure 3A:
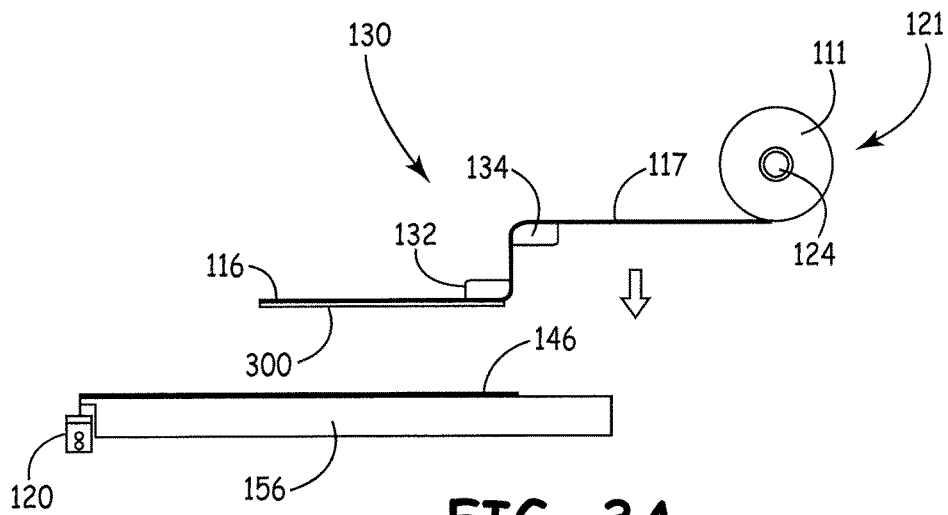
FIGS. 3A through 3D illustrate side views of an application head of one embodiment of the present invention forming bias-ply.

Referring to FIGS. 3A through 3E, side views of a portion of the application head 130, of one embodiment, are provided. FIGS. 3A through 3E illustrate the operation of the application head 130. FIG. 3A illustrates a first position of the application head 130 at the start of a cycle. In this position, application shoe 132 (first bar) and turn bar 134 (second bar) are raised a distance from the bias-ply backing material 146. In the embodiment of FIG. 1, the application shoe 132 and turn bar 134 are positioned away from the bias-ply backing material 146 via slots 139 in brackets 137-1 and 137-2. In this embodiment, an activation member, such as a pneumatic cylinder (not shown) controlled by the controller 174 (FIG. 1) moves the application shoe 132 and turn bar 134 in the respective slots 139 select distances from the bias-ply backing material 146. In the embodiment of FIGS. 3A through 3E, the application head 130 is coupled to the feedstock backing material assembly 121 that rotates feedstock backing windup 111 to collect the old backing material 117 from the feedstock 116. Hence, in this embodiment, as illustrated in FIGS. 3A through 3E, the application head 130 and the feedstock backing windup 111 selectively move in a horizontal direction. This horizontal movement is done with a linear actuator (not shown) that is under the control of the controller 174.

Figure 3B:
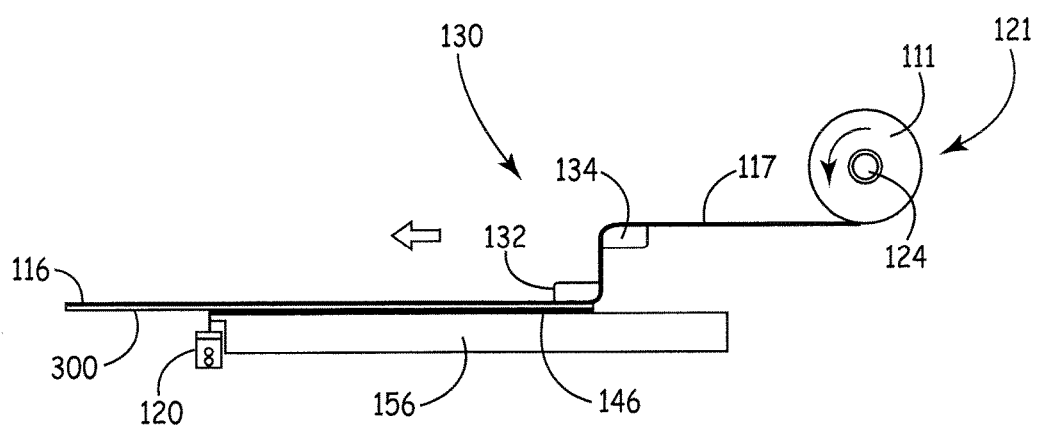
Figure 3C:
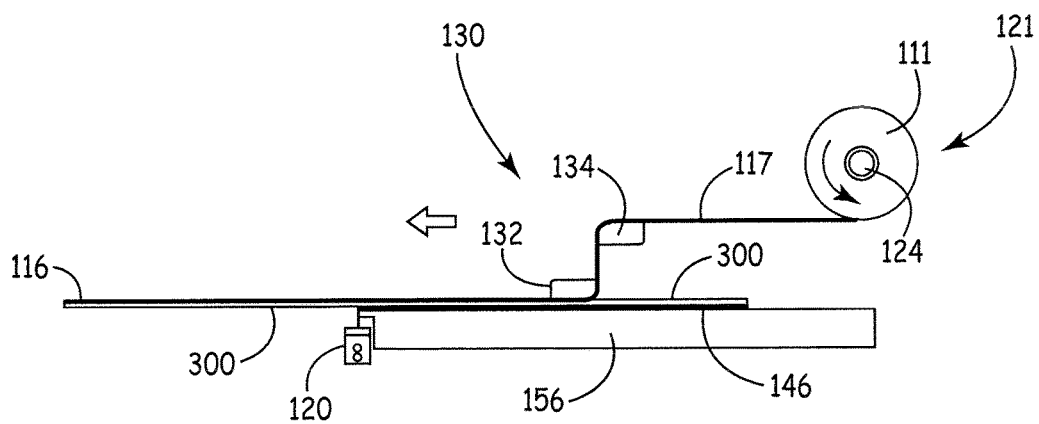
Figure 3D:
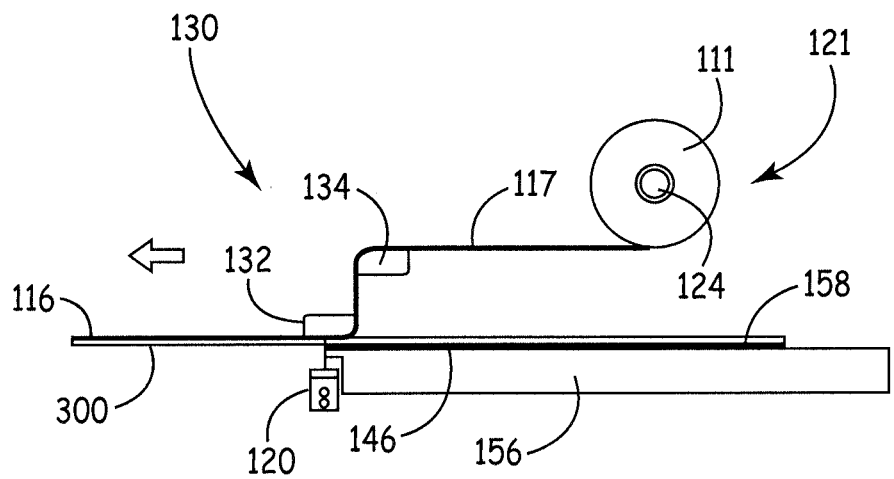
Figure 3E:
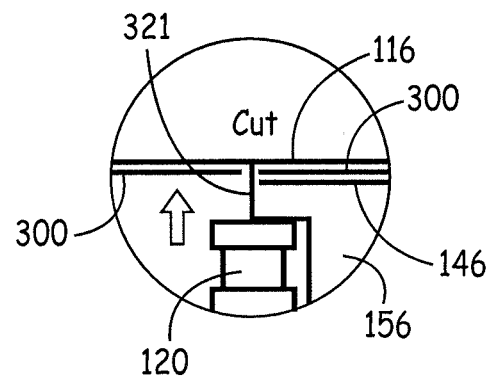
FIG. 3E is a close up view of a cutter of one embodiment of the present invention.

As FIG. 3A illustrates, the feedstock 116 is initially lowered to the bias-ply backing material 146 in the beginning of a cycle. The feedstock 116 includes feedstock backing material 117 and pre-preg 300. The pre-preg 300, in an embodiment, includes material with reinforcing fibers and resin. Once the feedstock 116 is lowered onto the bias-ply backing material 146, as illustrated in FIG. 3B, the application head 130 then moves in a horizontal direction across a width of the bias-ply backing material 146 with shoe 132 pressing the feedstock 116 onto the bias-ply backing material 146. In particular, as the application head 130 moves horizontally across the bias-ply backing material 146, as illustrated in FIG. 3C, bar 132 (or shoe) of the application head 130 presses the pre-preg 300 onto the bias-ply backing material 146. Bar 132 also peels off the feedstock backing material 117 from the pre-preg 300, once the pre-preg 300 is applied to the bias-ply backing material 146. Bar 134 (second bar) directs the peeled off feedstock backing material 117 toward feedstock backing windup 111. As illustrated, the feedstock backing windup 111 is rotated during the process to windup the feedstock backing material 117, and move the feedstock 116 along in the forming process. Bar 132 of the application head 130 presses the pre-preg 300 onto the bias-ply backing material 146 until it reaches an end of the width of the bias-ply backing material 146, as illustrated in FIG. 3D. At that point, the pre-preg 300 is cut by cutter 120. A close-up view of a cut is illustrated in FIG. 3E. As illustrated, a blade 321 of cutter 120 cuts the pre-preg 300 of the feedstock 116, but does not cut the feedstock backing material 117. Once the cut is made by the cutter 120, the application head 130 is lifted vertically and moved to the position as illustrated in FIG. 3A. A new cycle will start when the formed bias-ply 158 is moved out of the forming area of the application head 130. This process continues until a bias-ply 158 of a select length is made. Hence, the application head 130 automatically lays down pre-preg 300 from the feedstock 116 on the bias-ply backing material 146 one section after another until a roll of bias-ply 158 is formed. A gap or overlap distance between adjacent sections of pre-preg 300 is selectively controlled in embodiments based on the application. An example gap distance would be between no overlap to 0.050 of an inch. An example of an overlap would be where pre-preg fabric material is intentionally overlapped by 1 inch at all bias-ply joints. Other types of application heads are contemplated, such as, but not limited to, an application head using rollers. Hence, the present invention is not limited to the application head 130 disclosed in FIGS. 3A through 3D.

Figure 4:
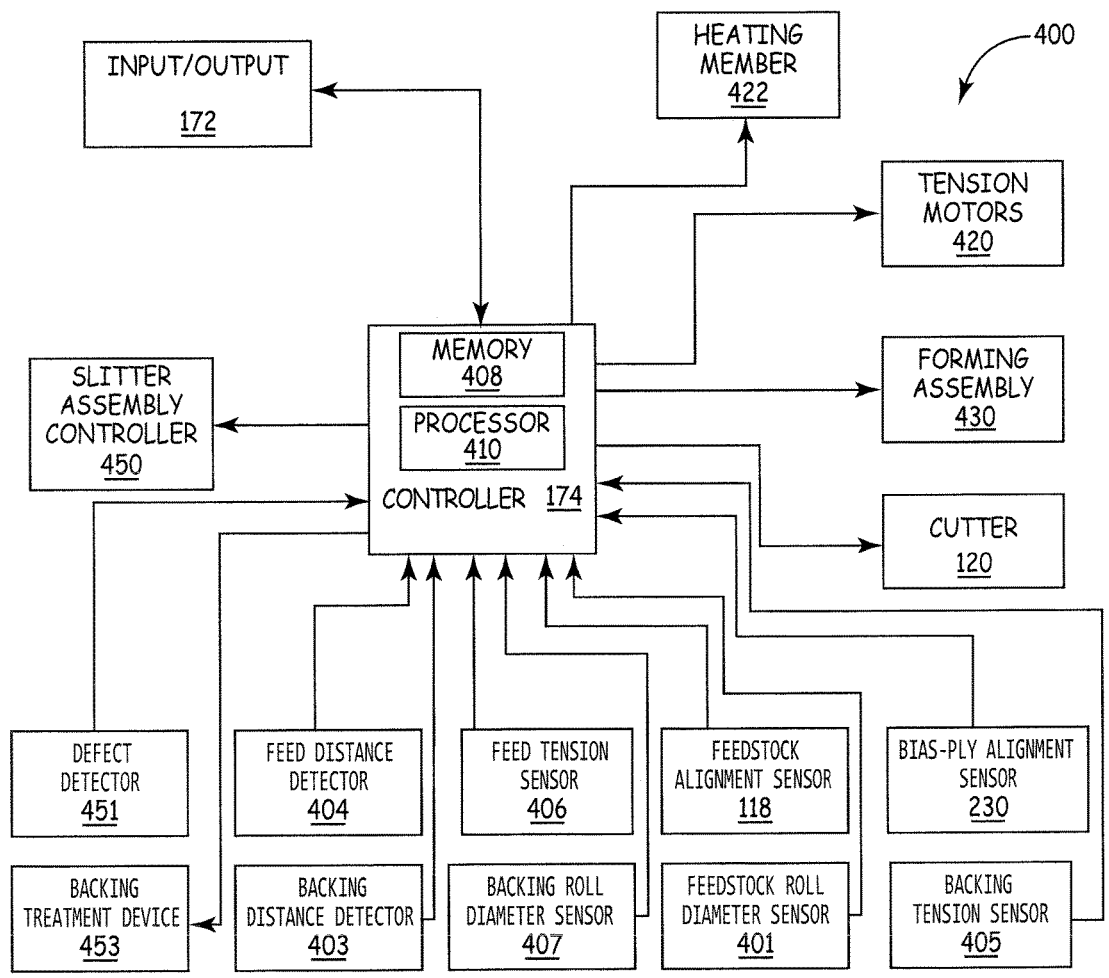
FIG. 4 is a block diagram of a material preparation machine of one embodiment of the present invention.

FIG. 4 illustrates a block diagram of an MPM 400 of one embodiment. As illustrated, this embodiment includes a controller 174. The controller 174 controls functions of the MPM 400. The controller 174 includes a processor 410 and a memory 408 to store instructions implemented by the processor 410. A processor, in general, includes or functions with software programs, firmware or computer-readable instructions for carrying out various methods, process tasks, calculations, and control functions. These instructions are typically tangibly embodied on any appropriate medium, such as memory 408, used for storage of computer-readable instructions or data structures. Such computer-readable media can be any available media that can be accessed by a general purpose or special purpose computer or processor, or any programmable logic device. Suitable computer-readable media may include storage or memory media such as magnetic or optical media, e.g., a disc or CD-ROM, volatile or non-volatile media such as RAM (e.g., SDRAM, DDR SDRAM, RDRAM, SRAM, etc.), ROM, EEPROM, Flash memory, etc.

As FIG. 4 further illustrates, the MPM 400 include an input/output (central console 172) to provide instruction to the controller 174 and provide information to a user from the controller 174, such as, but not limited to, the current settings of the MPM 400. One example setting is the gap distance between adjacent sections of bias-ply 300 applied to the bias-ply backing material 146. A feed distance detector 404 is positioned to detect the distance the feedstock 116 has moved. A backing distance detector 403 is positioned to detect the distance the bias-ply backing material 146/formed bias-ply 158 has moved. Distance information regarding the feedstock 116 and the bias-ply backing material 146 is provided to the controller 174. The controller 174 uses the distance information in operations of the MPM 400 including when to activate the application head 130 to the place the fibers 300 from the feedstock 116 onto the bias-ply backing material 146. The MPM 400 also includes a feed tension sensor 406 that is coupled to sense tension in the feedstock 116 and a backing tension sensor 405 coupled to sense tension in the bias-ply backing material 146. Further, the MPM 400 in one embodiment includes a bias-ply backing roll diameter sensor 407 and a feedstock roll diameter sensor 401 used by the controller 174 to set motor torque and tension. A feedstock alignment sensor 118 and a bias-ply alignment sensor 230 further provide alignment information back to the controller 174 relating to respective alignment of the feedstock 116 and the bias-ply backing material 146.

The controller 174 takes the information from detectors 403, 404 and sensors 118, 406, 407 and 401 and operates the MPM 400. In operating the MPM 400, the controller 174 controls the operation of motors of MPM 400 such as tension motors 144, 168, 110, and 126 designated generally as 420. Operation of the tension motors 420 includes activating the motors 420 and adjusting the speed of the motors 420. As stated above, the tension motors 420 include feedstock roll-off tension motor 110, feedstock backing material roll-up tension motor 126, bias-ply backing material roll-off tension motor 144 and bias-ply roll-up tension motor 168. Based on the speed of the motors 420 and the information gathered from detectors 403, 404 and sensors 118, 406, 401 and 230, the controller 174 operates the application head 130 as discussed in regard to FIGS. 3A through 3E. As further illustrated in FIG. 4, the controller 174 controls the cutter 120. FIG. 4 further illustrates a heating member 422. The heating member 422 is used to tack the fibers 300 to the bias-ply backing material 146. In particular, the heating member 422 heats the pre-preg to soften or increase the tack of the material to improve adherence bias-ply backing material 146. The heating member 422 in one embodiment is a heated nip roller, such as the heated nip roller 162 of FIG. 1. In the embodiment of FIG. 4, the heating member 422 is controlled by the controller 174. Also illustrated in FIG. 4, is a slitter assembly controller 450. The slitter assembly controller 450 is used to control a slitting machine such as slitting machine 900, illustrated in FIG. 10 and described below. In the embodiment of FIG. 4, the controller 174 controls slitter assembly controller 450.

Further illustrated in FIG. 4 is a backing treatment device 453 that is controlled by the controller 174. The backing treatment device 453 is designed to increase the tackiness of the bias-ply backing material 146 to enhance adhesion of the pre-preg material 300 to the bias-ply backing material 146 to form the bias-ply 158. In one embodiment, the backing treatment device 453 is a corona discharge device similar to corona discharge devices described in commonly assigned patent application titled "Backing for Pre-Preg Material" having U.S. patent application Ser. No. 12/701,126, filed on Feb. 5, 2010, now U.S. Pat. No. 8,999,098, issued Apr. 7, 2015, which is herein incorporated in its entirety by reference. The MPM 400 of FIG. 4 further includes a defect detector 451. The defect detector 451, in one embodiment, includes optical sensors in communication with the controller 174 that are designed to detect flaws or defects, such as, but limited to, overlapping sections of pre-preg, gaps between sections beyond a predefined limit, breaks in the pre-preg and undesired discrepant material present. In one embodiment, the MPM 400 is designed to form more than one layer of bias-ply (multi-layered bias-ply). In this embodiment, subsequent layers of pre-preg are formed on a formed bias-ply (the bias-ply backing plus pre-preg). In one embodiment, the formed bias-ply is substituted for the feedstock 116 and the MPM 400 is run again to form the multi-layered bias-ply. In another embodiment, the controller 450 reverses direction of the tension motors 420 to pass the formed bias-ply under the forming assembly 430. This can occur until a desired number of layers of pre-preg have been used to form the multi-layered bias-ply.

Figure 5:
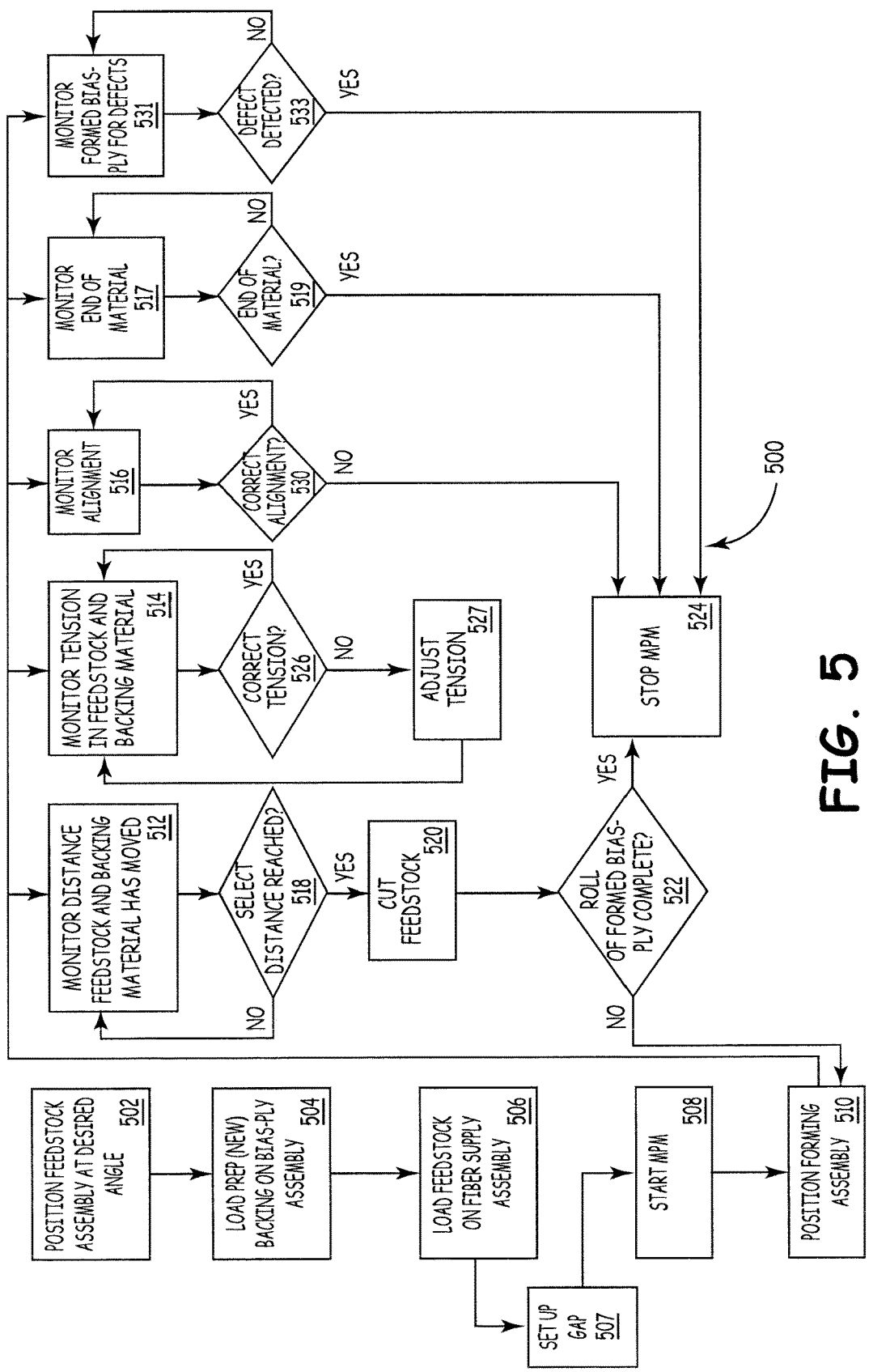
FIG. 5 is a process flow diagram of one embodiment of the present invention.

A process flow diagram 500 illustrating operation of an MPM of one embodiment is shown in FIG. 5. The process starts by positioning the feedstock assembly 103 at the desired angle in relation to the bias-ply assembly 105 to select the desired bias-ply orientation (502). Once the positioning of the feedstock assembly 103 is complete, the bias-ply backing material 146 is loaded on the bias-ply assembly 105 (504). The feedstock 116 (which is uni-directional tape in one embodiment) is then loaded on the feedstock assembly 103 (506). The desired gap distance between adjacent segments of pre-preg placed on the bias-ply backing material 146 is set (507). Once the feedstock 116 and the bias-ply backing material 146 are both loaded and threaded up on the machine and the desired gap distance is set, the MPM is started (508). The application head 130 is then positioned (510). The positioning of the application head 130 is discussed above in regard to FIGS. 3A through 3E. As the process flow diagram 500 further illustrates, after the MPM 100 is activated, the feedstock 116 and bias-ply backing material 146 are monitored to determine distances moved (512). Also monitored is the tension in the feedstock 116 and bias-ply backing material 146 (514). Further, the alignment of the feedstock 116 and the new bias-ply backing material 146 are monitored (516). It is determined if the correct alignment of the feedstock 116 and bias-ply backing material 146 is detected (530). If the correct alignment is detected (530), the alignment monitoring is continued (516). If the correct alignment is not detected in either of the feedstock 116 and the new bias-ply backing material 146 (530), the MPM 100 is stopped and the alignment is corrected (524). If it is determined that the tension in the feedstock 116 and the bias-ply backing material 146 is correct (526), the process continues monitoring the tension at (514). If, however, the tension in the feedstock 116 and the bias-ply backing material 146 is determined to not be correct (526), the tension is corrected (527). Also monitored is the end of bias-ply backing material 146 and feedstock material 116 (517). If an end of the material is not detected (519), the end of material is continued to be monitored (517). If an end of material is detected (519), the MPM 100 is stopped (524). Further still monitored, is if the formed bias-ply has any defects (531). If no defects are detected (533), the monitoring for defects continues (531). If defects are detected (533), the MPM 100 is stopped (524).

Further, if a select distance of the feedstock 116 and the bias-ply backing material 146 has not been reached (518), the distance continues to be monitored (512). Once a select distance has been reached (518), the fibers 300 on the feedstock 116 are cut (520). It is then determined if a complete roll of bias-ply 158 has been formed (522). If a complete roll of bias-ply 158 has not been formed (522), the process continues by positioning the forming assembly accordingly (510) and the process continues. Once a complete roll of bias-ply 158 has been determined to be formed (522), the MPM stops (524).

Figure 6:
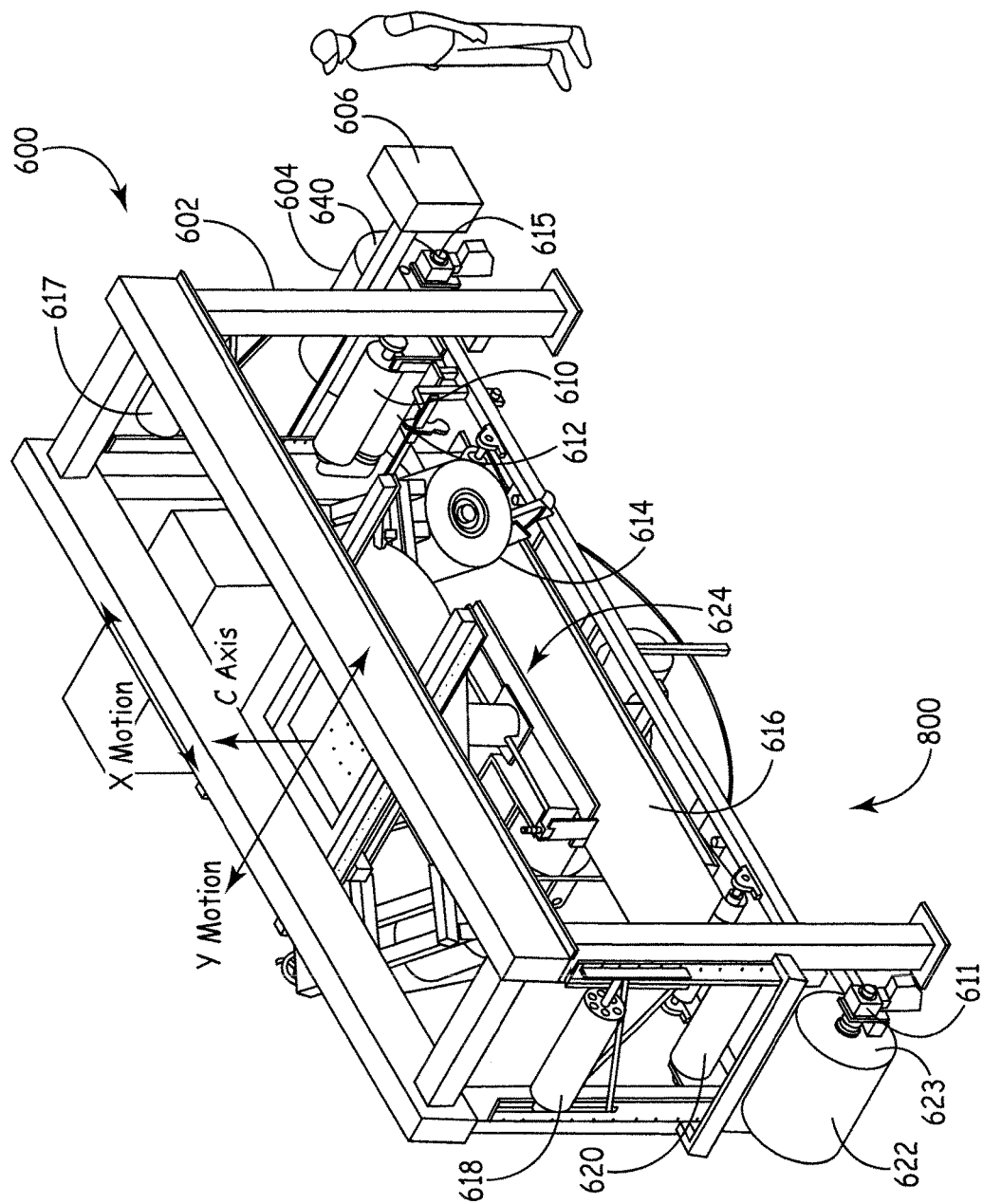
FIG. 6 is a side perspective view of a material preparation machine of another embodiment of the present invention.

Referring to FIG. 6, another embodiment of an MPM is illustrated. MPM 600 includes a frame 602 (or gantry) upon which the components of the MPM 600 are coupled. The MPM 600 includes a bias assembly 800 (or re-back handling assembly) and an application head 624. The bias assembly 800 includes a vacuum conveyor 616 upon which bias-ply backing material (or re-back) 622 from a bias-ply backing material roll-off 623 (or bias-ply backing material unwind 623) is passed along. The vacuum conveyor 616 keeps the bias-ply backing material 622 in place as a feedstock is being applied by the application head 624. Formed bias-ply 640 is collected on a bias-ply roll-up 604 (or bias-ply rewind 604). A roll-off accumulator 618 and a roll-up accumulator 617 adjust tension in the bias-ply backing material 622, as further discussed below. Redirect roller 620 directs the bias-ply backing material 622 on the vacuum conveyor 616. Compaction nips 612 and 610 compress transferred pre-preg onto the bias-ply backing material 622 and direct the formed bias-ply 640 on bias-ply roll-up 604.

Figure 7A:
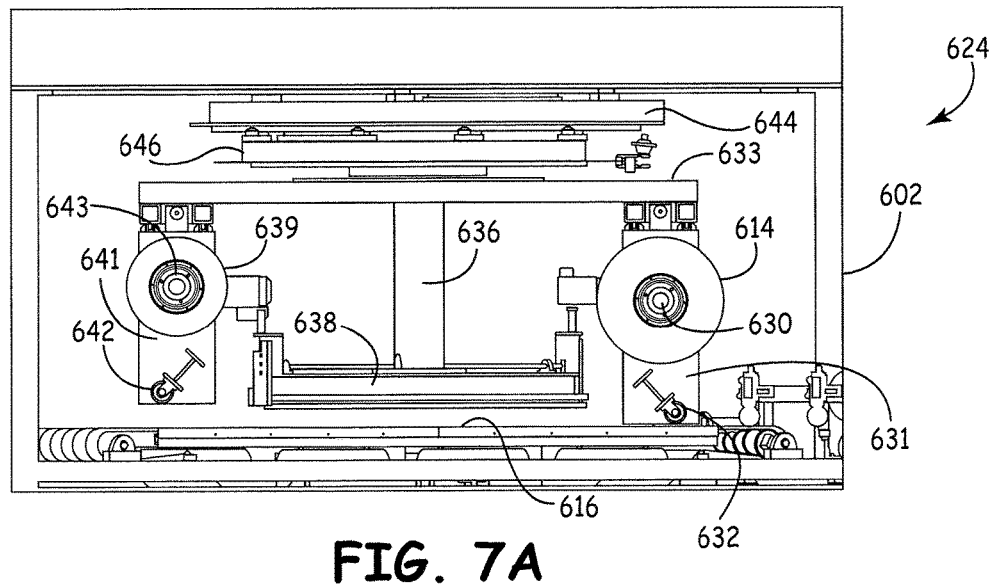
FIG. 7A is a first side view of an application head of the material preparation machine of FIG. 6.
Figure 7B:
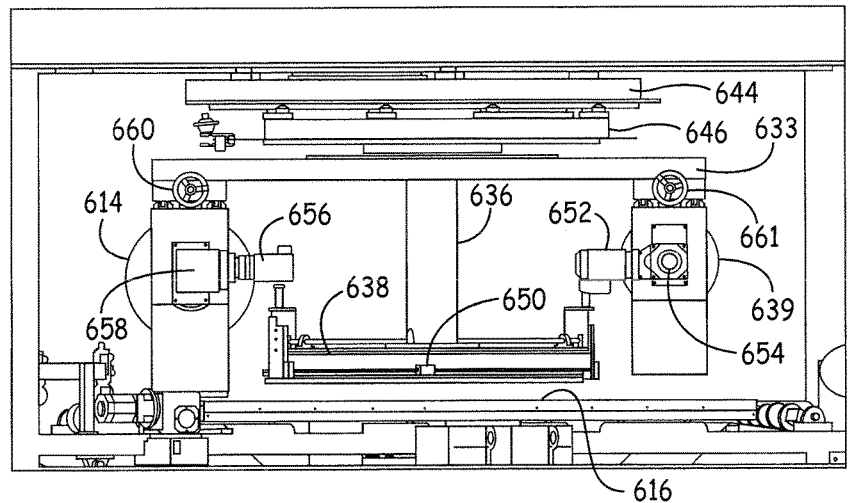
FIG. 7B is a second side view of the application head of the material preparation machine of FIG. 6.

The application head 624 is designed to move in X and Y motion directions and about a C-axis as illustrated in FIG. 6. FIGS. 7A and 7B illustrate side views of the application head 624. The placement head 624 includes a compaction head 638 that is coupled to a non-rotating support 636. The non-rotating support 636 is coupled to frame supports 646 and 644. A rotating frame member 633 is coupled to rotate about the non-rotating support 636. A feedstock unwind 614 and feedstock backing windup 639 are coupled to the rotating frame member 633 so that a path of the feedstock can be adjusted in relation to a path of the bias-ply backing. The feedstock unwind 614 is rotationally coupled to unwind centering chuck 630, which is coupled to unwind support 631. An encoder roller 632 is further coupled to the unwind support 631. The unwind support 631 is coupled proximate a first end of the rotating frame member 633. The feedstock backing windup 639 is rotationally coupled to windup centering chuck 643, which is coupled to windup support 641. A redirect roller 642 is further coupled to the windup support 641. The windup support 641 is coupled proximate a second end of the rotating frame member 633.

A windup motor 652 (feedstock backing windup tension motor), illustrated in FIG. 7B, rotates the windup centering chuck 643. Also illustrated in FIG. 7B is a windup clutch 654 that is operationally coupled to the windup motor 652. An unwind motor 656 (feedstock unwind tension motor) is coupled to rotate the unwind centering chuck 630. An unwind clutch 658 is operationally coupled to the unwind motor 656. In one embodiment, the windup motor 652 is an induction motor and the unwind motor 656 is a servo motor. Further illustrated in FIG. 7B is cutter cylinder 650 used to cut the fiber from the feedstock backing. Also illustrated are offset adjustments 660 and 661 that are used to align the feedstock unwind 614 and the feedstock backing windup 639 of the application head 624.

Figure 7C:
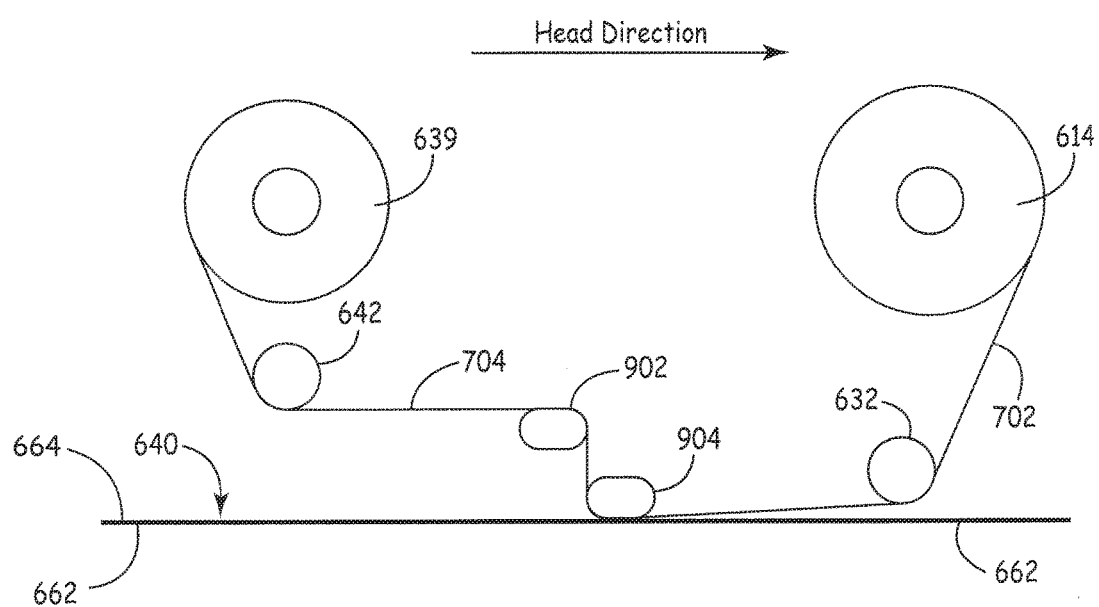
FIG. 7C is an illustration of the operation of an application head of one embodiment of the present invention.

Referring to FIG. 7C, a side view illustration of the operation of the application head 624 is shown. Bias-ply backing material 662 is positioned on the vacuum conveyor 616 (not shown in FIG. 7C). Feedstock 702 from the feedstock unwind 614 is routed to a placement shoe 904 (first bar) by encoder roll 632. The placement shoe 904 presses the pre-preg 664 on the bias-ply backing material 662 as the placement head 624 is passed across a width of the backing material 662. Once the feedstock backing material is separated from its associated pre-preg, it is routed to the feedstock backing windup 639 via turn bar 902 (second bar) and redirect roller 642. The formed bias-ply 640 includes the transferred pre-preg 664 and the bias-ply backing material 662. Once the entire width of the bias-ply backing material 662 has been covered with the transferred pre-preg 664, the pre-preg 664 is cut with cutter cylinder 650 illustrated in FIG. 7B. Then, the application head 624 is repositioned and the process starts again once the bias-ply backing material 662 has moved a select distance on the vacuum conveyor 616.

Figure 8:
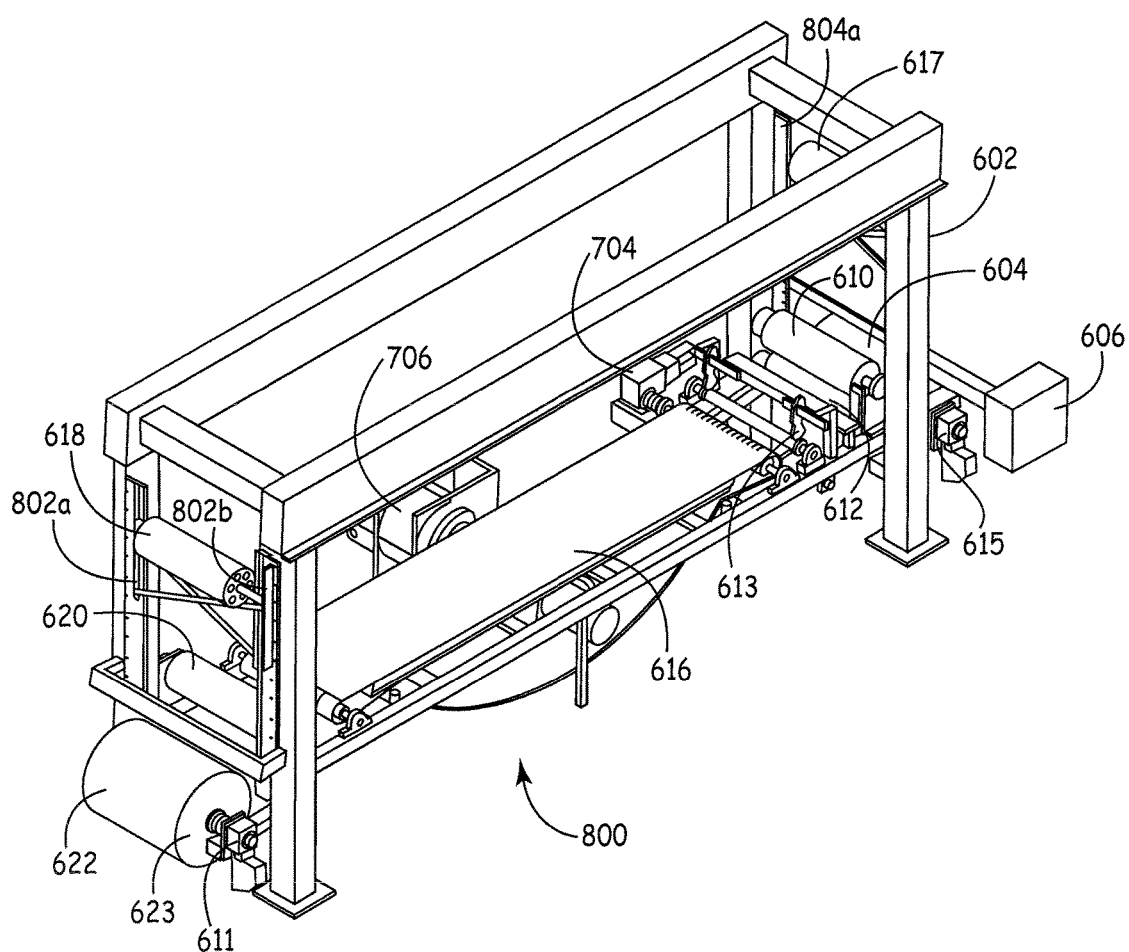
FIG. 8 is a side perspective view of a bias-ply assembly portion of the material preparation machine of FIG. 6.

FIG. 8 illustrates a side perspective view of the bias assembly 800 of the MPM 600 of FIG. 6. As illustrated, bias-ply backing material roll-off 623 is rotationally coupled to a chuck that is rotationally moved via roll-off drive motor 611 (bias-ply backing roll-off tension motor). Bias-ply windup roll-up 604 is similarly coupled to a chuck that is rotationally moved via roll-up drive motor 615 (bias-ply roll-up tension motor). Further illustrated, is a vacuum blower 706 for the vacuum conveyor 616 and vacuum conveyor servo motor 704. This embodiment also includes slitters 613 to trim the edges of formed bias-ply 640 and a controller 606 that controls function of the MPM 600. With the use of the slitters 613, the width of the formed bias-ply 640 can be less than the width of the bias-ply backing material 622. Hence, the width of the formed bias-ply 640 can be less than or equal to the width of the bias-ply backing material 622. In addition, the bias-ply backing material 622 can have any desired width that the MPM 600 will accommodate.

Figure 9A:
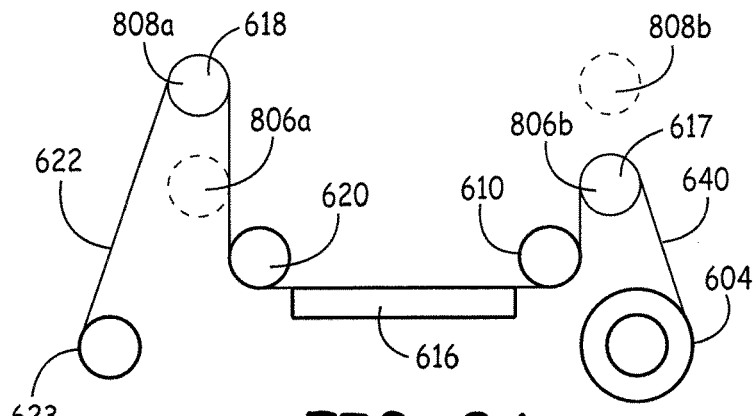
FIGS. 9A through 9C are illustrations of a table web control system of one embodiment of the present invention.
Figure 9B:
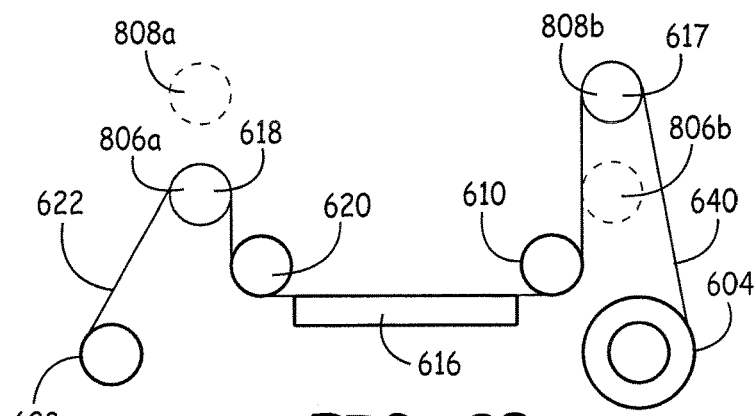
Figure 9C:
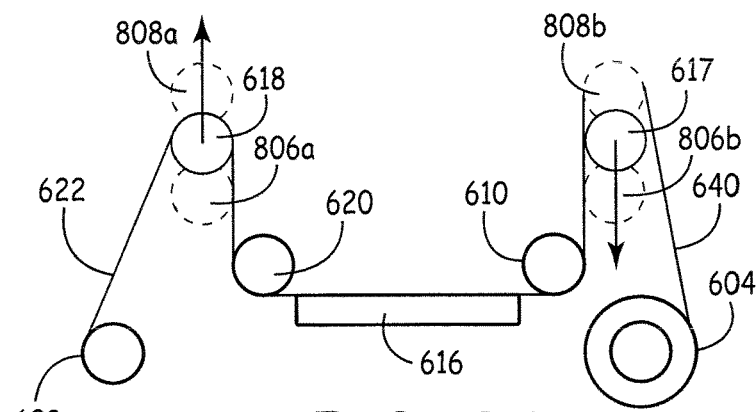
Figure 10:
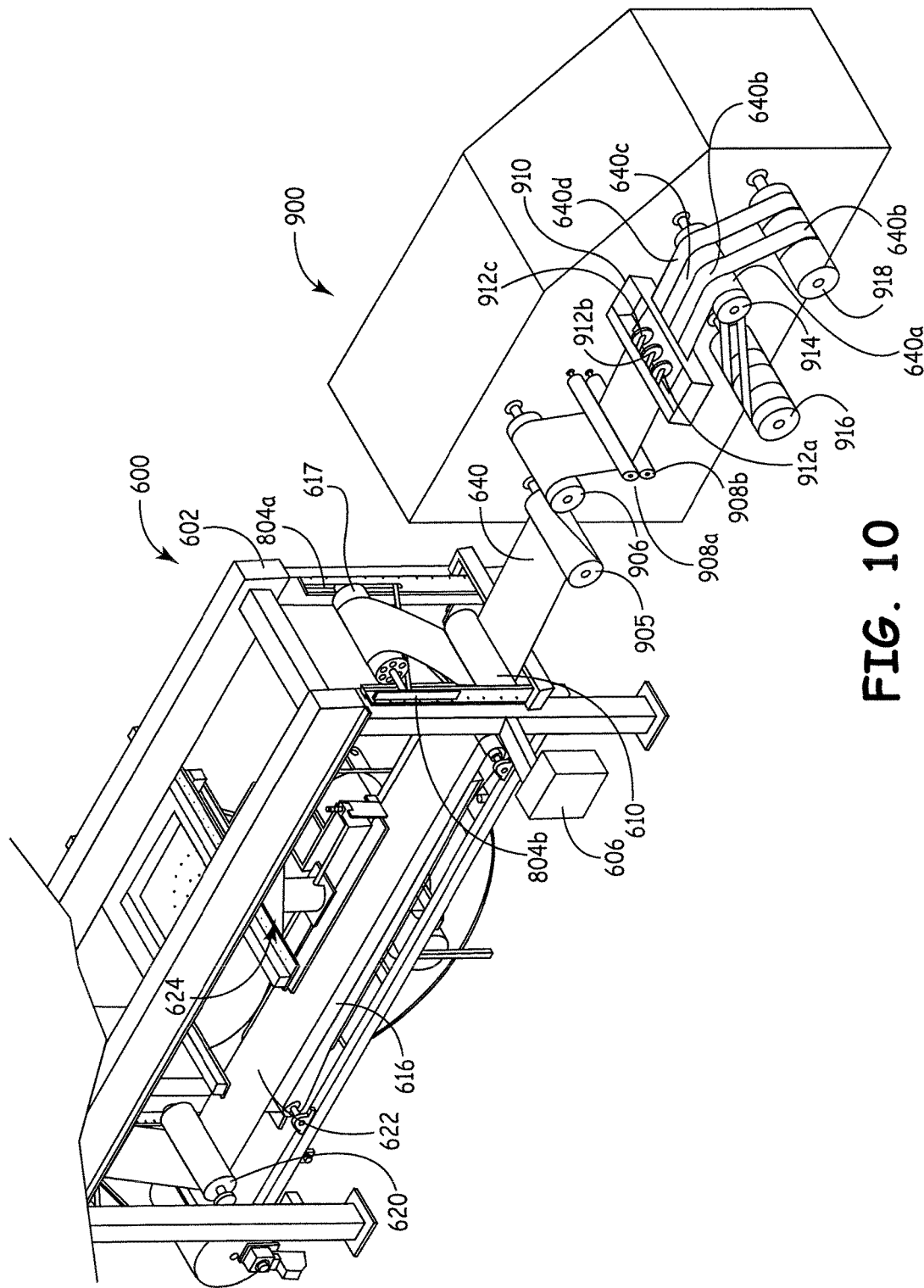
FIG. 10 is a side perspective view of another embodiment of an MPM machine with a slitter device of one embodiment of the present invention.

Roll-off accumulator 618 and roll-up accumulator 617 are used to control tension in the backing material 622 and the formed bias-ply 640. In one embodiment, roll-off accumulator 618 is pneumatically loaded to set web tension in the bias-ply backing material 622 by slidably adjusting the position of the roll-off accumulator 618 engaged with the bias-ply backing material 622 via tracks 802a and 802b. Roll-up accumulator 617 is similarly pneumatically loaded to set web tension in the formed bias-ply 640 by slidably adjusting the position of the windup accumulator 617 engaged with the formed ply 640 via tracks 804a and 804b (track 804b is illustrated in FIG. 10). How the roll-off accumulator 618 and the roll-up accumulator 617 operate to control tension is illustrated in FIGS. 9A through 9C. Referring to FIG. 9A, an illustration of the positioning of the roll-off accumulator 618 and roll-up accumulator 617 at a beginning of a move cycle is provided. At the beginning of this cycle, the roll-off accumulator 618 is in position 808a, which is at a farthest distance from the bias-ply backing material roll-off 623. The roll-up accumulator 617, at the beginning of the cycle is at position 806b, which is at a closest position to the bias-ply roll-up 604. The bias-ply backing material 622/formed bias-ply 640 are then moved along the vacuum conveyor 616 once the roll-off accumulator 618 and roll-up accumulator 617 are in the positions as illustrated in FIG. 9A. After the move cycle, the roll-off accumulator 618 and roll-up accumulator 617 are positioned, as illustrated in FIG. 9B. In particular, the roll-off accumulator 618 is at position 806a, which is at a closest distance to the bias-ply backing material roll-off 623. Meanwhile, the roll-up accumulator 617 is at position 808b, which is a position that is the farthest from the formed bias-ply roll-up 604. During lay down of the pre-preg 664 (FIG. 7C)

on the bias-ply feedstock backing material 622, the roll-off accumulator 618 and roll-up accumulator 617 are being moved to reset their respective positions to the beginning of the cycle as illustrated in FIG. 9C. In an embodiment, the controller 606 controls the tension motors 611 and 615 based, at least in part, on the then current position of accumulators 617 and 618.

Referring to FIG. 10, another embodiment of an MPM 600 is illustrated. This embodiment includes an integrated slitter device 900. In this embodiment, the slitter device 900 is controlled by controller 606 of the MPM 600. The slitter device 900 is used to cut formed bias-ply 640 into two or more strips of select widths for a particular application. The example slitter device 900 of this embodiment includes redirect rollers 905 and 906 that redirect the formed bias-ply 640 from bias-ply roller 610 of the MPM 600. The bias-ply 640 passes then through nip rollers 908a and 908b and into knife holder 910. The knife holder 910 holds a plurality of knives 912a, 912b, and 912c that can be selectively positioned to cut the bias-ply 640 into as many strips as desired having select widths. In the example embodiment, three knives 912a, 912b, and 912c are used to cut the bias-ply 640 into four strips of bias-ply 640a, 640b, 640c, and 640d. Redirect roller 914 is used to direct bias-ply strips 640a and 640c to be collected on rewind 916 and bias-ply strips 640b and 640d to be collected on rewind 918. Hence, the sheet of formed bias-ply 640 is slit into strips of bias-ply 640a, 640b, 640c and 640d that can be used to accommodate a specific application.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

What is claimed is:

1. A material preparation device, the device comprising:
a bias-ply assembly configured to pass bias-ply backing material along a first path;
a feedstock assembly configured to pass a feedstock along a second path that crosses the first path at a select angle, the feedstock including fiber-reinforced material having the fibers at a first orientation relative to an edge of the feedstock;
an application head configured to transfer the fiber-reinforced material from the feedstock to the bias-ply backing material at a location where the first path crosses the second path to form a bias-ply with the fibers of the fiber-reinforced material having a second different orientation relative to an edge of the formed bias-ply, wherein the bias-ply backing material is configured to be removed from the bias-ply during formation of a part on a tool, wherein the application head comprises a mounting feature configured to have a let-off supply of the feedstock of the feedstock assembly positioned on and carried by the application head, and wherein both the application head and the let-off supply of the feedstock carried on the application head are configured to move in unison relative to and independent from the bias-ply assembly and the first path;
a cutter configured to selectively cut the fiber-reinforced material of the feedstock, the cutter configured to be positioned at the location where the feedstock crosses the bias-ply backing material, wherein the cutter is configured to traverse at least a portion of a width of the feedstock to cut the fiber-reinforced material of the feedstock; and
a controller configured to:
control the bias-ply assembly to pass the bias-ply backing material;
control the feedstock assembly to pass the feedstock;
control the application head in transferring the fiber-reinforced material onto the bias-ply backing material; and
control the cutter to traverse the cutter along at least a portion of the fiber-reinforced material of the feedstock.

2. The device of claim 1, wherein the bias-ply assembly is adjustable relative to the feedstock assembly to selectively adjust the select angle that the second path crosses the first path in order to position the fibers of the bias-ply at a desired orientation relative to the edge of the formed bias-ply.

3. The device of claim 1, wherein the cutter is configured to selectively cut the fiber-reinforced material of the feedstock without substantially cutting a feedstock backing material of the feedstock.

4. The device of claim 1, wherein the bias-ply assembly further comprises:
a bias-ply backing material roll-off configured to hold a roll of the bias-ply backing material; and
a bias-ply roll-up configured to hold a roll of formed bias-ply.

5. The device of claim 4, further comprising:
a bias-ply backing material roll-off tension motor configured to rotate and properly tension the biasply backing material roll-off; and
a bias-ply roll-up tension motor configured to rotate and tension the bias-ply roll-up, the bias-ply backing material roll-off tension motor and the bias-ply roll-up tension motor controlled, at least in part, by the controller.

6. The device of claim 5, further comprising:
a bias-ply backing tension sensor in communication with the controller; and
a bias-ply backing roll diameter sensor in communication with the controller, wherein the controller is configured to control the bias-ply backing material roll-off tension motor and the bias-ply roll-up tension motor based on communications from at least one of the bias-ply backing tension sensor and the bias-ply backing roll diameter sensor to achieve a desired tension in the bias-ply backing material.

7. The device of claim 4, wherein the bias-ply assembly further comprises:
a roll-off accumulator configured to be engaged with the bias-ply backing material, the roll-off accumulator configured to move select distances in relation to the bias-ply backing material roll-off; and
a roll-up accumulator configured to be engaged with the formed bias-ply, the roll-up accumulator configured to move select distances in relation to the bias-ply roll-up, wherein the controller is configured to use the positioning of the roll-off accumulator and the roll-up accumulator to, at least in part, control a desired tension in the bias-ply backing material and the formed bias-ply.

8. The device of claim 4, wherein the bias-ply assembly further comprises a vacuum conveyor configured to pass the bias-ply backing material along the first path while at least partially securing the bias-ply backing material to a surface of the vacuum conveyor.

9. The device of claim 1, wherein the application head further comprises:
a first forming bar configured to selectively press the fiber-reinforced material from the feedstock onto the bias-ply backing material; and
a second forming bar configured to direct a feedstock backing material to a feedstock backing windup, wherein the first forming bar and the second forming bar are each coupled to at least one retaining bracket to prevent movement of the first forming bar relative to the second forming bar and the application head.

10. The device of claim 1, further comprising:
a feedstock unwind tension motor configured to rotate the feedstock unwind; and
a feedstock backing windup tension motor configured to rotate the feedstock backing windup, the feedstock unwind tension motor and the feedstock backing windup tension motor controlled, at least in part, by the controller;
a feed tension sensor in communication with the controller configured to sense the tension in the feedstock; and
a feedstock roll diameter sensor in communication with the controller, wherein the controller is configured to control the feedstock unwind tension motor and the feedstock backing windup tension motor based, at least in part, on communications from at least one of the feed tension sensor and the feedstock roll diameter sensor to achieve a desired tension in the feedstock and the feedstock backing material.

11. The device of claim 1, further comprising at least one of:
a feed distance detector configured to determine the distance the feedstock has moved, the feed distance detector in communication with the controller;
a bias-ply backing distance detector configured to determine the distance the bias-ply backing material has moved, the bias-ply backing distance detector in communication with the controller, wherein the controller is configured to control placement of the feedstock on the bias-ply backing material based on the communications from the feed distance detector and the bias-ply backing distance detector;
a bias-ply alignment sensor configured to monitor the alignment of the bias-ply backing material, the bias-ply alignment sensor in communication with the controller, wherein the controller is configured to control operation of the device based, at least in part, on communications from the bias-ply alignment sensor;
a feedstock alignment sensor configured to monitor the alignment of the feedstock, the feedstock alignment sensor in communication with the controller, wherein the controller is configured to control operation of the device based, at least in part, on communications from the feedstock alignment sensor;
a defect detector configured to detect defects in the formed bias-ply; or
a backing treatment device configured to adjust the adhesive properties of the bias-ply backing material.

12. The device of claim 1, further comprising a slitter device, the slitter device configured to slit the formed bias-ply along a length of the formed bias-ply into a select number of strips of at least one select width.

13. A material preparation device, the device comprising:
a bias-ply assembly comprising:
a bias-ply backing material unwind configured to hold a roll of bias-ply backing material; and
a bias-ply rewind configured to engage formed bias-ply, the bias-ply backing material unwind and the bias-ply rewind configured to pass the bias-ply backing material along a bias-ply path between the bias-ply backing material unwind and the bias-ply rewind;
a movable application head movably coupled to the bias-ply assembly configured to move relative to and independent from the bias-ply path, the application head comprising:
a feedstock supply unwind configured to hold a roll of feedstock;
a feedstock backing material windup configured to hold a roll of feedstock backing material from the feedstock, the feedstock supply unwind and the feedstock backing material windup configured to pass feedstock between the feedstock supply unwind and the feedstock backing material windup, wherein a path formed by a passing of the feedstock between the feedstock supply unwind and the feedstock backing material windup crosses the bias-ply path formed by a passing of the bias-ply backing material between the bias-ply backing material unwind and the bias-ply rewind at a select angle;
wherein the movable application head is configured to transfer a fiber-reinforced material from the feedstock to the bias-ply backing material at a location where the path of the feedstock crosses the bias-ply path of the bias-ply backing material, and wherein the application head is configured to traverse over the location where the path of the feedstock crosses the bias-ply path of the bias-ply backing material in order to transfer a fiber-reinforced material from the feedstock to the bias-ply backing material; and
a cutter on and coupled to the movable application head, the cutter configured to cut the fiber-reinforced material of the feedstock to a selected width for the movable application head to transfer the fiber-reinforced material from the feedstock across a select width of the bias-ply backing material, the cutter positioned on the movable application head to move in unison with the movable application head as the movable application head traverses over the location where the path of the feedstock crosses the bias-ply path of the bias-ply backing material; and
a controller configured to control the bias-ply assembly, the application head, and the cutter to form the bias-ply.

14. The device of claim 1, wherein the cutter is configured to traverse a width of the feedstock to cut the fiber-reinforced material of the feedstock while at least a portion of the feedstock is in contact with the bias-ply backing material.

15. A material preparation device, the device comprising:
a backing material assembly configured to pass bias-ply backing material along a first path;
a feedstock assembly configured to pass a feedstock along a second path that crosses the first path at a select angle, the feedstock comprising fiber-reinforced material having the fibers extending at a first orientation relative to an edge of the feedstock;
a movable application head configured to transfer the fiber-reinforced material from the feedstock to the bias-ply backing material at a location where the first path crosses the second path to form a bias-ply with the fibers of the fiber-reinforced material extending at a second orientation relative to an edge of the formed bias-ply, wherein at least a portion of the feedstock assembly is positioned on and carried by the movable application head, and wherein each of the movable application head and the at least a portion of the feedstock assembly positioned on and carried by the movable application head are configured to move along the backing material assembly to transfer the fiber-reinforced material from the feedstock to the bias-ply backing material; and a cutter configured to cut the fiber-reinforced material of the feedstock once the application head has transferred the fiber-reinforced material from the feedstock across a select width of the bias-ply backing material.

16. The device of claim 15, wherein the cutter is configured to traverse a width of the feedstock to cut the fiber-reinforced material of the feedstock while the application head is in contact with at least a portion of the feedstock.

17. The device of claim 15, wherein the application head comprises:
a first forming bar configured to selectively press the fiber-reinforced material from the feedstock onto the bias-ply backing material; and
a second forming bar configured to separate a feedstock backing material away from the formed bias-ply to a feedstock backing material collection device.

18. A material preparation device, the device comprising:
a backing material assembly configured to pass bias-ply backing material along a first path;
a feedstock assembly configured to pass a feedstock along a second path that crosses the first path at a selected angle, the feedstock comprising fiber-reinforced material having the fibers extending at a first orientation relative to an edge of the feedstock adhered to a feedstock backing material; and
an application head configured to transfer the fiber-reinforced material from the feedstock to the bias-ply backing material at a location where the first path crosses the second path to form a bias-ply with the fibers of the fiber-reinforced material extending at a second orientation relative to an edge of the formed bias-ply, the application head comprising:
a forming member having a contact surface configured to contact and selectively press the fiber-reinforced material from the feedstock onto the bias-ply backing material, the forming member mounted to the application head to prevent rotation of the forming member and the contact surface relative to the application head.

19. The device of claim 18, further comprising a cutter configured to traverse a width of the feedstock to cut the fiber-reinforced material of the feedstock while the application head is in contact with at least a portion of the feedstock.

20. The device of claim 18, further comprising a cutter configured to traverse a width of the feedstock to cut the fiber-reinforced material of the feedstock while the application head is in contact with at least a portion of the feedstock and at least a portion of the bias-ply backing material.

21. The device of claim 18, wherein the forming member comprises:
a first forming bar configured to selectively press the fiber-reinforced material from the feedstock onto the bias-ply backing material; and
a second forming bar configured to direct the feedstock backing material away from the formed bias-ply.

22. The device of claim 21, wherein the first forming bar is laterally offset in a direction along a length of the feedstock from the second forming bar.

23. The device of claim 21, wherein the first forming bar and the second forming bar are each coupled to at least one retaining bracket to prevent movement of the first forming bar relative to the second forming bar.

24. The device of claim 18, wherein the fiber-reinforced material comprises a fabric having fibers extending substantially parallel to and substantially perpendicular to the edge of the feedstock.

25. A material preparation device, the device comprising:
a backing material assembly configured to pass bias-ply backing material along a first path;
a feedstock assembly configured to pass a feedstock along a second path that crosses the first path at a selected angle, the feedstock comprising fiber-reinforced material having the fibers extending at a first orientation relative to an edge of the feedstock adhered to a feedstock backing material;
an application head configured to transfer the fiber-reinforced material from the feedstock to the bias-ply backing material at a location where the first path crosses the second path to form a bias-ply with the fibers of the fiber-reinforced material extending at a second orientation relative to an edge of the formed bias-ply; and
a vacuum conveyor configured to:
pass the bias-ply backing material along the first path while at least partially securing the bias-ply backing material to a surface of the vacuum conveyor; and
secure the bias-ply backing material to the surface of the vacuum conveyor while the application head transfers the fiber-reinforced material from the feedstock to the bias-ply backing material.

26. The device of claim 25, further comprising a backing treatment device configured to adjust the adhesive properties of the bias-ply backing material.

27. The device of claim 25, further comprising nip rollers configured to compact the formed bias-ply after the application head transfers the fiber-reinforced material from the feedstock to the bias-ply backing material.

28. The device of claim 25, further comprising a defect detector configured to detect defects in the formed bias-ply.

29. The device of claim 25, further comprising a controller configured to control the application head, wherein the controller is configured to provide one of a gap or an overlap between adjacent sections of the fiber-reinforced material from the feedstock as the fiber-reinforced material is transferred to the bias-ply backing material.

30. The device of claim 25, further comprising a heating member configured to increase adhesion between the fiber-reinforced material from the feedstock and the bias-ply backing material.

31. The device of claim 25, further comprising an integrated slitter device coupled to slit the formed bias-ply into a select number of strips of select widths.

32. The device of claim 25, further comprising a controller configured to control the application head, the backing material assembly, and the feedstock assembly, wherein the controller is configured move one or more of the application head, the backing material assembly, and the feedstock assembly to apply at least two overlapping layers of the fiber-reinforced material from the feedstock on a section of the bias-ply backing material.

33. The device of claim 15, wherein the material preparation device is configured to reverse the direction of the formed bias-ply to apply additional fiber-reinforced material from the feedstock over at least one of the bias-ply backing material or the formed bias-ply.

34. The device of claim 15, wherein the cutter is configured to cut the fiber-reinforced material of the feedstock once the application head has transferred the fiber-reinforced material from the feedstock across an entire width of the bias-ply backing material.

35. The device of claim 13, wherein at least one of the feedstock supply unwind or the feedstock backing material windup is positioned on the movable application head and is configured to move relative to and independent from the bias-ply path with the movable application head.

36. A material preparation device, the device comprising:
  a backing material assembly configured to pass bias-ply backing material along a first path; and
  a movable application head configured to be movable relative to the first path, the application head comprising a feedstock assembly on the movable application head, the movable application head and the feedstock assembly configured to pass a feedstock along a second path that crosses the first path at a selected angle to apply at least a portion of the feedstock to the bias-ply backing material, the feedstock comprising fiber-reinforced material having fibers extending at a first orientation relative to an edge of the feedstock adhered to a feedstock backing material.

37. The material preparation device of claim 36, wherein the feedstock assembly of the movable application head further comprises a feedstock backing windup mounted to the movable application head for collecting the feedstock backing material from the feedstock.

38. The material preparation device of claim 36, wherein the feedstock assembly of the movable application head further comprises a feedstock let-off supply mounted to the movable application head for supplying the feedstock to the bias-ply backing material.

39. The material preparation device of claim 36, wherein the movable application head is configured to apply a length of the feedstock to the bias-ply backing material by moving the movable application head with the feedstock assembly laterally over a section of the bias-ply backing material while forcing the length of the feedstock onto the bias-ply backing material.

* * * * *

UNITED STATES PATENT AND TRADEMARK OFFICE
CERTIFICATE OF CORRECTION

PATENT NO. : 10,155,348 B2
APPLICATION NO. : 15/137832
DATED : December 18, 2018
INVENTOR(S) : Jason K. Slack et al.

Page 1 of 1

It is certified that error appears in the above-identified patent and that said Letters Patent is hereby corrected as shown below:

In the Specification
Column 5, Line 35, change "possible. Example a" to --possible. Example α--

Signed and Sealed this
Nineteenth Day of February, 2019

Andrei Iancu
*Director of the United States Patent and Trademark Office*